March 21, 1972 W. M. HICKAM ET AL 3,650,934
OXYGEN CONTROL AND MEASURING APPARATUS
Filed Nov. 14, 1969 7 Sheets-Sheet 7

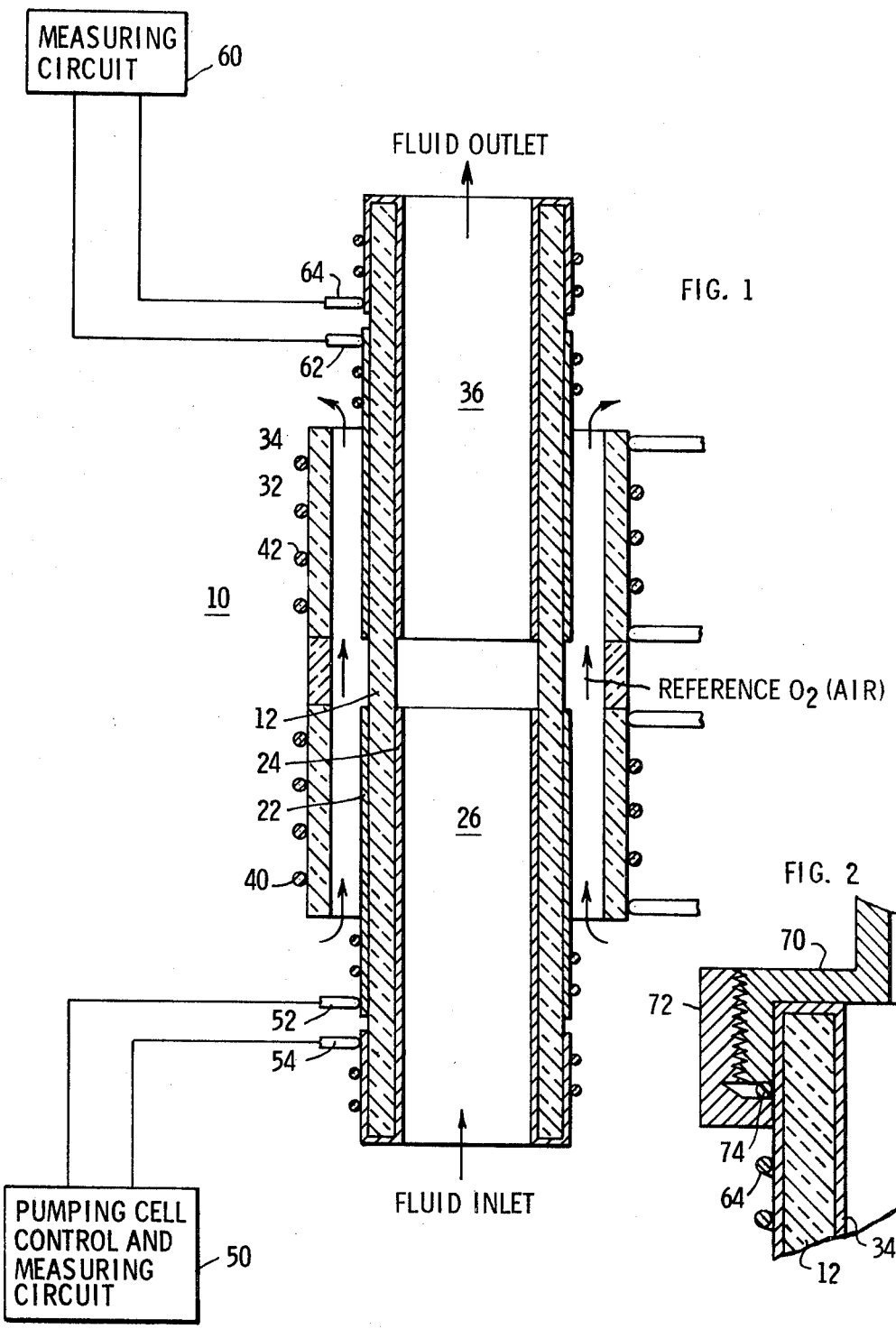

United States Patent Office 3,650,934
Patented Mar. 21, 1972

3,650,934
OXYGEN CONTROL AND MEASURING APPARATUS
William M. Hickam, Pittsburgh, and Robert E. Witkowski, West Mifflin, Pa., assignors to Westinghouse Electric Corporation, Pittsburgh, Pa.
Filed Nov. 14, 1969, Ser. No. 876,791
Int. Cl. G01n 27/26, 27/30
U.S. Cl. 204—195                                    3 Claims

ABSTRACT OF THE DISCLOSURE

The invention comprises a combination of a solid electrolyte electrochemical cell as an oxygen ion pumping means and a second solid electrolyte electrochemical cell as an oxygen measuring means, the combination regulating and measuring the oxygen concentration of a fluid respectively.

BACKGROUND OF THE INVENTION

Field of the invention

The invention relates to a system for monitoring the oxygen concentration of a fluid and more particularly to a dual cell solid electrolyte electrochemical device for controlling and measuring the oxygen concentration of a fluid.

Description of the prior art

The development of the solid electrolyte electrochemical cell as a device for measuring oxygen concentration, as described U.S. Pats. 3,347,767 and 3,400,054 assigned to the assignee of the present invention, has facilitated the design of oxygen monitoring systems for numerous applications. The solid electrolyte cell exhibits rapid response in the form of ion conduction to oxygen concentration differences between electrodes by developing an EMF as a function of this difference. In systems providing a known oxygen concentration at one electrode the EMF generated can be calibrated to indicate the oxygen concentration at a second electrode.

Commercially available oxygen measuring devices are capable of measuring oxygen in the parts per million range. The accuracy of the commercial devices of these low oxygen ranges is difficult to determine due to the inability to calibrate the device as the lower oxygen concentration ranges.

SUMMARY

The invention relates to a dual electrochemical cell arrangement in which one cell is utilized as an oxygen pump for either introducing oxygen ions into a fluid or removing oxygen ions from a fluid while a second cell is utilized as a conventional oxygen concentration measuring device. A fluid is considered to include both liquids and gases.

A typical dual cell arrangement utilizes a common tubular solid electrolyte member with a pair of electrodes disposed in operative contact with the solid electrolyte to form two independent electrochemical cells. Each electrode pair is disposed in opposed relationship, one on the inner surface of the tubular member and the other on the external surface of the tubular member.

The capability of introducing controlled levels of oxygen into the fluid provides means for introducing a calibration signal by which the measuring cell can be calibrated. The capability of introducing known oxygen levels into a fluid also permits selective doping of fluids.

In the instance where the first cell is required to introduce oxygen into a fluid flowing through the tubular member, a variable resistance shorting circuit is applied between the electrodes of the pumping cell to draw a current from the cell which initiates oxygen conductivity from an oxygen reference source through the solid electrolyte and into the fluid. The level of current flow, which is a function of the resistance value, determines the amount of oxygen introduced into the fluid.

Furthermore, the pumping action of the first cell can be reversed by applying a voltage of proper polarity between the electrodes. This mode of operation provides for the removal of oxygen from the fluid. This mode of operation is desirable in conjunction with systems such as inert gas glove boxes, welding chambers, etc., in which the oxygen level is to be maintained at a negligible level.

The electrochemical cell operating as an oxygen pump represents a completely electrical device for pumping oxygen. It is a maintenance free device which does not require regeneration or replacement of chemicals as is required in many conventional systems.

In addition the pumping action of the cell can be utilized to remove water vapor from atmospheres, as well as pumping the oxides of nitrogen and carbon.

In all applications of the dual cell arrangement the second cell functions to generate an EMF as an indication of the oxygen concentration of the fluid following the pumping action of the first cell.

DESCRIPTION OF THE DRAWING

FIG. 1 is a sectioned view of a preferred embodiment of the invention;

FIG. 2 is a partial cross-sectional view of a portion of the assembly for the embodiment of FIG. 1;

DESCRIPTION OF THE PREFERRED EMBODIMENT

Figure 4:
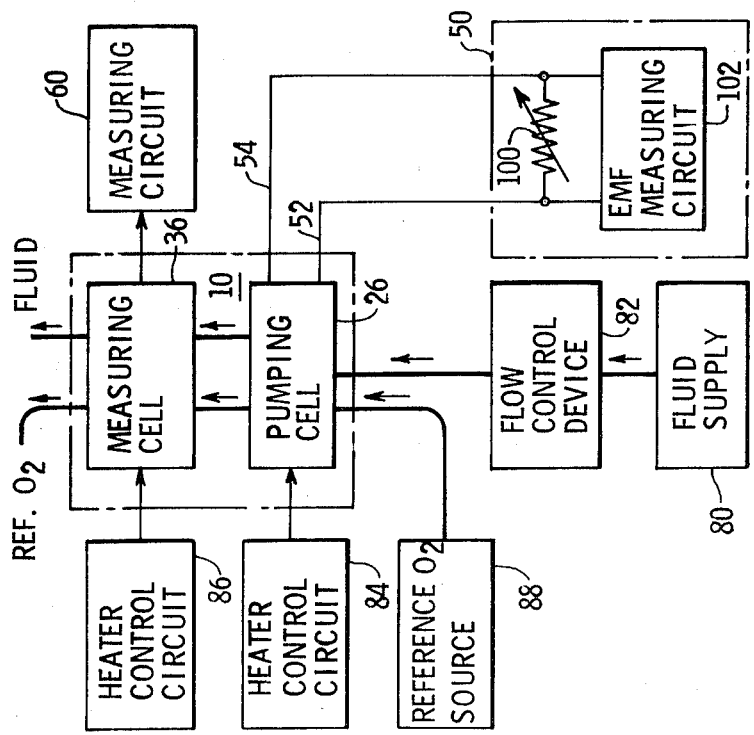
FIG. 4 is a block diagram depicting the operation of the embodiment of FIG. 1 for introducing oxygen into a fluid.

Referring to FIG. 1 there is illustrated a dual electrochemical cell oxygen control and indicating device 10.

The device 10 comprises a tubular electrolyte member 12 of a solid material which conducts oxygen ions with negligible electronic conductivity. Suitable electrolyte materials are described in detail in the above noted U.S. patents.

The tubular electrolyte member 12 is open ended to permit the entrance of a fluid at one of said tubular electrolyte and the exhaust of the fluid from the other end.

Disposed on the outer surface of the tubular electrolyte member 12 in conductive contact therewith are operatively isolated electrically conductive electrodes 22 and 32. A second pair of electronically conductive electrodes 24 and 34 are disposed on the inner surface of the tubular electrolyte member 12 in substantially opposed relationship with the outer electrodes 22 and 32 respectively. The electrodes 22, 24, 32 and 34 are in the form of thin layers disposed in intimate contact with the electrolyte surface. It is necessary that the electrode material, in addition to exhibiting high electrical conductivity, support the diffusion of oxygen ions as well as being suitable for operation at the high temperatures to which the device 10 is subjected. Typical electrode materials include platinum and compositions of mixed valence oxide compounds. The electrodes 22 and 24 in conjunction with the tubular electrolyte member therebetween form a first electrochemical cell 26. The electrodes 32 and 34 in conjunction with the tubular electrolyte member therebetween form a second electrochemical cell 36.

In general the cell ionic conductivity is a function of the oxygen content of the atmospheres in contact with the electrodes. An imbalance or difference in oxygen content at the respective electrodes of a cell will result in ion conductivity in the cell according to the electrochemical reaction, $$O_2 + 4 \text{ electrons} \rightleftharpoons 2O^=$$

Electrons provided by this reaction can be measured as an indication of the difference in oxygen concentration and in the event the oxygen concentration at one electrode is known, the oxygen concentration at the other electrode is directly determinable.

Electrical heaters 40 and 42 are disposed about the independent electrochemical cells 26 and 36, respectively, so as to maintain the electrolyte material at a desired operating temperature, typically between 650° C. and 1000° C. Suitable control means (not shown) provide independent temperature control of cells 26 and 36. The relatively high operating temperature appreciably increases the ionic conductivity of the tubular electrolyte member 12. As an alternative to the heating of the cells 26 and 36 by heaters 40 and 42, the fluid may be heated externally to a temperature sufficient to heat the electrolyte to the operating temperature.

While a single heater could be used to heat both cells 26 and 36, this can result in undesirable electronic conduction within the electrolyte member between the cells 26 and 36. This electronic conduction, which is promoted by the heating of the electrolyte material between the respective cells effectively provides a shorting path between the cells 26 and 36. It is therefore desirable to maintain the temperature of the electrolyte between cells 26 and 36 as cool as possible to minimize electronic conduction therethrough.

Electrochemical cell 26 is functionally identified as an oxygen pumping cell while the electrochemical cell 36 is functionally identified as an oxygen measuring cell. The independent operation of the cells 26 and 36 provide dual cell capabilities for controlling the oxygen concentration of the fluid and measuring the oxygen concentration of the fluid respectively.

A pumping cell control and measuring circuit 50 is connected to the electrodes 22 and 24 of the oxygen pumping cell 26 by the electrical lead wires 52 and 54. The magnitude and direction of cell 26 current flow between the electrodes 22 and 24 determines the degree and direction of oxygen ion conduction in the tubular electrolyte member and consequently determines the ultimate oxygen content of the fluid.

An external EMF measuring circuit 60 is connected to the electrodes 32 and 34 of the oxygen measuring cell 36 by electrical leads 62 and 64. The EMF measuring circuit 60 responds to the EMF generated by the cell 36 in response to the oxygen concentration of the fluid and converts the cell EMF into a direct indication of the oxygen concentration of the fluid.

The pumping action provided by cell 26 can be utilized to:

(a) Introduce oxygen from an oxygen reference external to the tubular electrolyte into the fluid stream within the tubular electrolyte to determine the response of the measuring cell 36 and thereby function as a calibration source, (b) Introduce oxygen into the fluid stream to establish a desired fluid oxygen concentration level, and (c) Remove oxygen from the fluid to maintain a negligible fluid oxygen concentration level as measured by the cell 36.

In the operation of the dual cell device 10 for the addition of oxygen to the fluid within the tubular electrolyte member 12, a suitable stable oxygen reference media of known oxygen content is required at the external surface of the tubular electrolyte 12. Air is selected as a reference in discussing the embodiment of FIG. 1 in that air represents an inexpensive, available source of known oxygen concentration. It is apparent, however, that the oxygen reference may take the form of any fluid or solid composition exhibiting a desired level of oxygen.

Suitable means, as illustrated in FIG. 2, are provided to isolate the fluid within the electrolyte member 12 from the oxygen reference. The seal configuration shown in FIG. 2 comprises inner and outer threaded members 70 and 72 respectively which fit over the end of the tube 12 with a seal formed by an O-ring 74 compressed therebetween.

Figure 3:
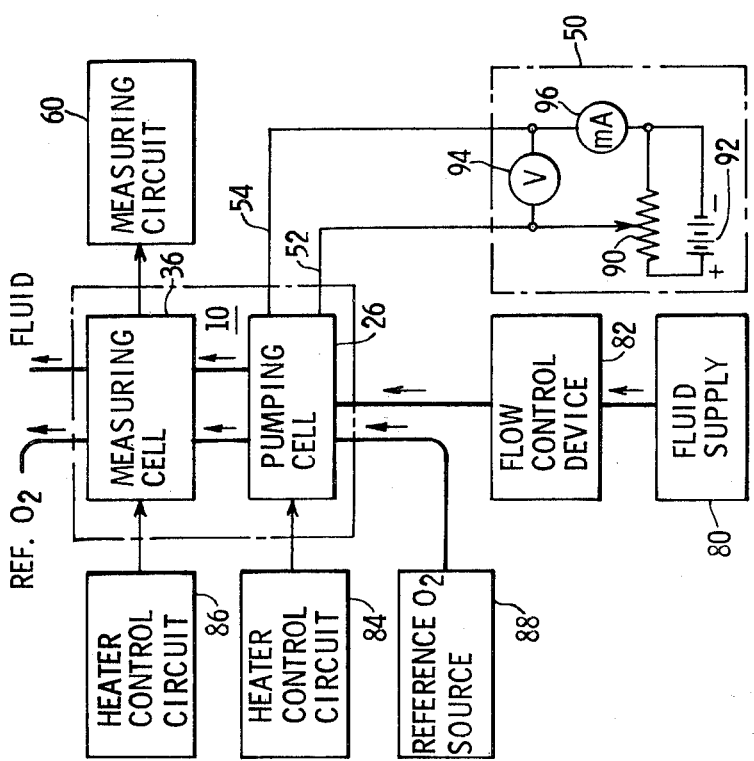
FIG. 3 is a block diagram depicting the operation of the embodiment of FIG. 1 for removing oxygen from a fluid.

Referring to FIGS. 3 and 4 there is illustrated in block diagram form the modes of operation of the dual cell device 10 of FIG. 1 corresponding to the removal and addition of fluid oxygen respectively.

FIG. 3 illustrates a schematic diagram of a system for controllably removing oxygen from a flowing fluid. The fluid from the fluid supply 80 of which the oxygen content is to be adjusted and measured by the pumping electrochemical cell 26 and the measuring electrochemical cell 36 respectively is supplied first to a flow control device 82 which may be of any of the well known types. Flow control device 82 maintains a uniform volume flow rate of the fluid to insure accurate determination of the oxygen content of the fluid by the dual cell device 10. Heater control circuits 84 and 86 establish and maintain the temperature of the pumping and measuring cells 26 and 36 at the operating temperature required to support electrochemical cell oxygen ion conduction between the fluid and the oxygen reference provided by the reference oxygen source 88.

In the operation of the dual cell device 10 in the oxygen removal mode the pumping cell control and measuring circuit 50 of FIG. 1 is schematically represented in FIG. 3 as comprising a variable resistance element 90 in the form of a potentiometer connected across a D-C voltage source 92.

An applied potential of a polarity indicated to the external and internal pumping cell electrode leads 52 and 54 respectively and the resulting current flow established between the electrodes 22 and 24 of pumping cell 26 results in the migration of oxygen as $O^=$ from the fluid through the tubular electrolyte to the oxygen reference environment. The ionic oxygen then recombines as diatonic oxygen; the amount of oxygen thus removed from the fluid being a function of the voltage applied to the electrodes 22 and 24 as measured by voltmeter 94 and the current drawn through the electrolyte as measured by the milliammeter 96.

The oxygen reference required for the operation of the pumping cell 26 to introduce oxygen into the fluid is not required during cell 26 operation as a device for removing oxygen from the fluid.

The potentiometer 90 adjustment, which provides control of the voltage applied across the electrodes of the oxygen pumping cell 26 and the current flow therebetween, provides direct control of the amount of the oxygen removed from the flowing fluid.

The measuring cell 36 functions as a galvanic cell by developing an EMF as a function of the difference in the oxygen content between the fluid and the reference oxygen environment. Inasmuch as the oxygen content of the reference oxygen environment is a known constant value, the EMF measuring circuit 60 can be calibrated to respond to the EMF developed by cell 36 as a direct indication of the oxygen content of the fluid.

Figure 5:
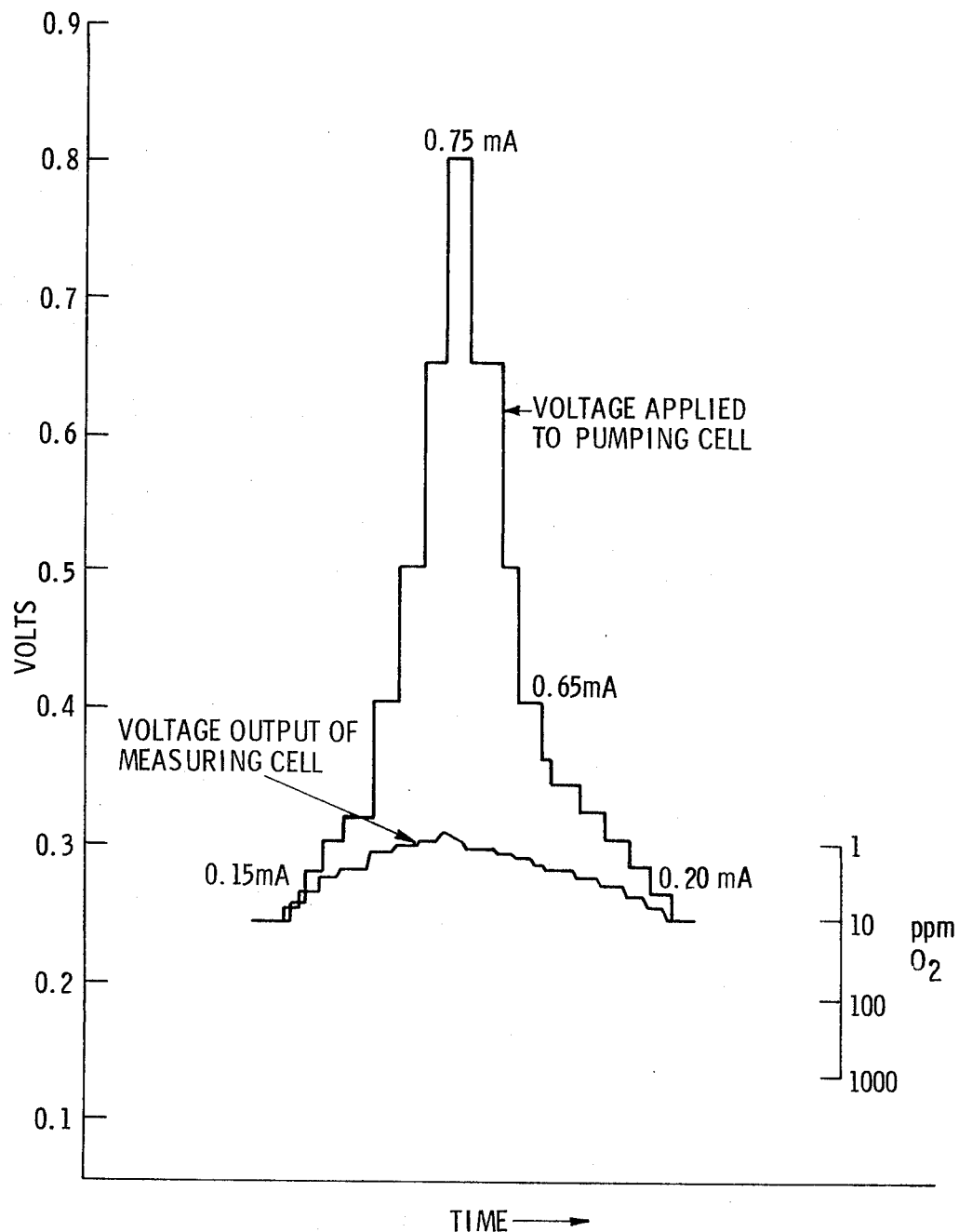
FIGS. 5, 6, and 7 are curves illustrating the operation of the embodiment of FIG. 3.
Figure 6:
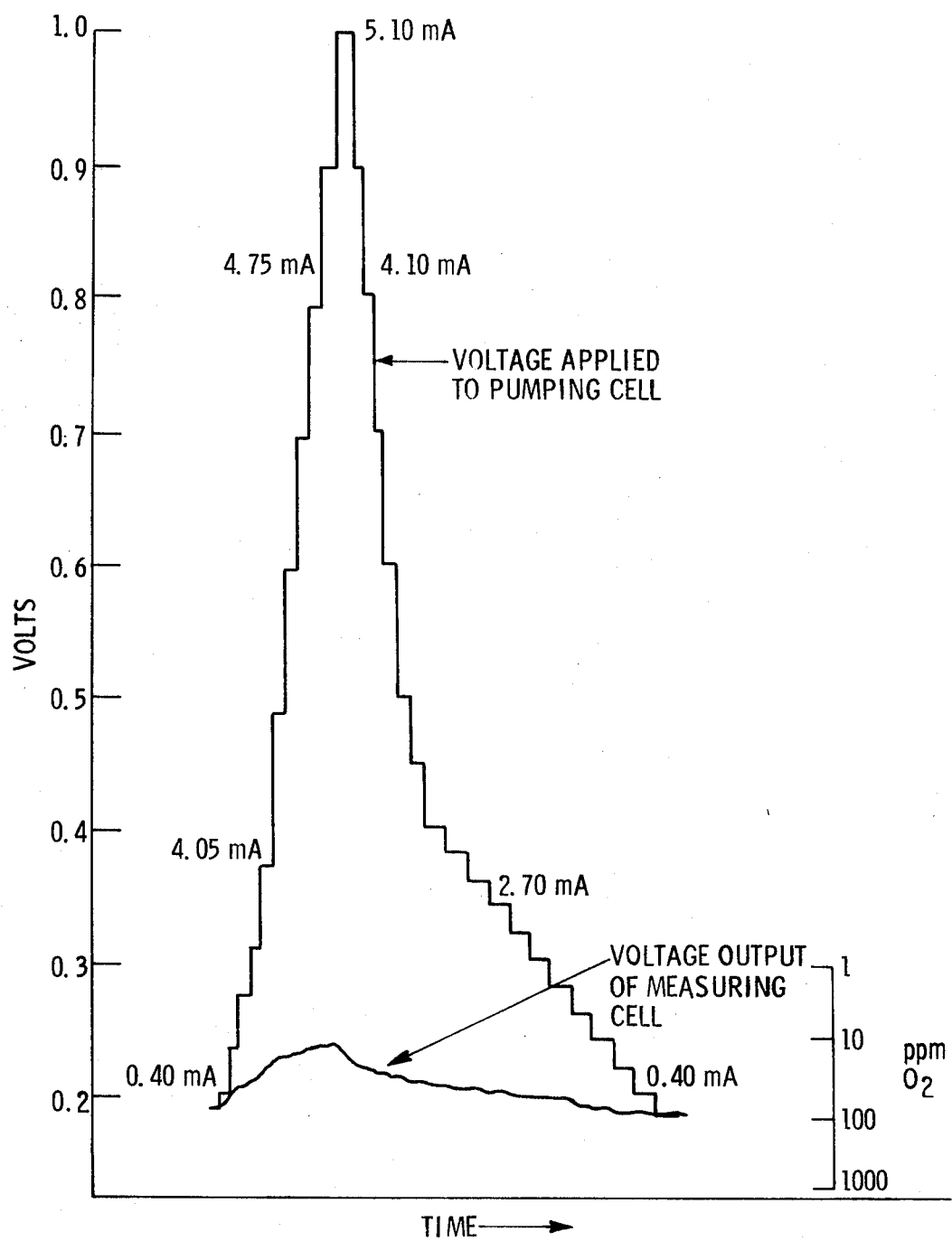
Figure 7:
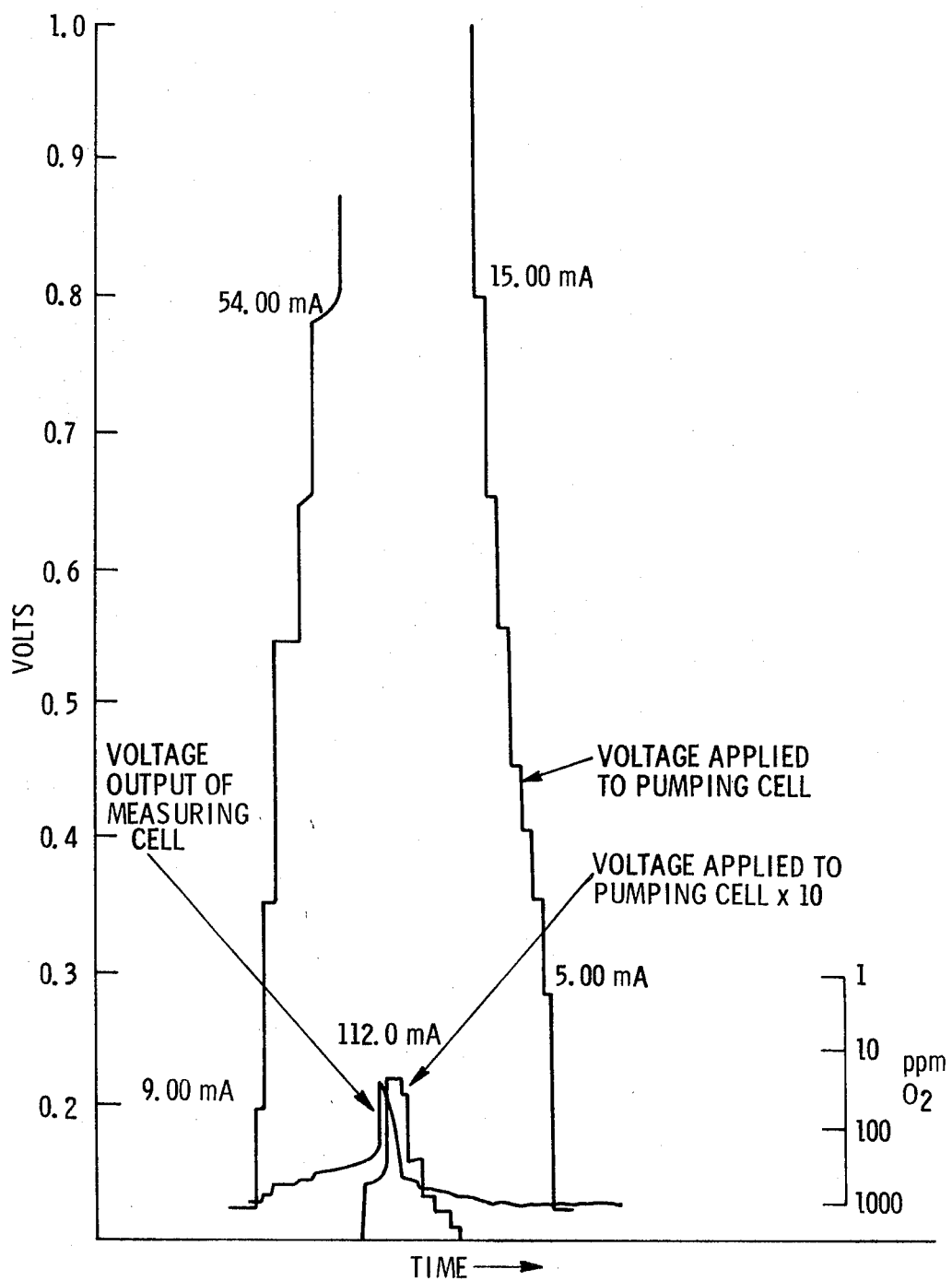

FIGS. 5, 6, and 7 illustrate the pumping capability of electrochemical cell 26 for gases containing various concentrations of oxygen. The curves labeled "Voltage Applied to Pumping Cell" indicate the voltage and, at various points, the current drawn through cell 26 necessary to achieve oxygen removal. The curves labeled "Voltage Output of Measuring Cell" indicates the amount of oxygen remaining in the fluid. The small scale labeled "p.p.m. $O_2$" refers to the measuring cell curve and converts the EMF of the measuring cell 36 into p.p.m. (parts per million) $O_2$ remaining in the gas stream.

In the event sufficient voltage is applied to the electrodes 22 and 24 of cell 26 to remove substantially all oxygen from the fluid, the oxygen ion induced current as measured by the ammeter 62 of circuit 60 is an indication of the fluid oxygen concentration.

In addition to the oxygen removal from gases the oxygen pumping cell 26 can be utilized to remove water vapor from an atmosphere as well as separating oxygen from the oxides of nitrogen and carbon.

Assuming electrodes of cell 26 are thin layers of platinum, the surface of the platinum electrodes act as catalytic surfaces at normal cell operating temperatures. In the presence of water vapor the hot catalytic surfaces of the platinum electrodes disassociates the water molecules into hydrogen and oxygen components with the oxygen being pumped ionically through the cell electrolyte.

The nature of the electrolyte as described in the referenced patents, is such that gases other than oxygen cannot be transferred electrolytically therethrough. Therefore, in the presence of oxides such as nitrogen the pumping cell removes only the oxygen leaving behind diatomic nitrogen.

In the operation of the dual cell device 10 in a mode whereby oxygen from the reference oxygen environment is introduced into the flowing fluid, the pumping cell control and measuring circuit of FIG. 1 is schematically represented in FIG. 4 as comprising a variable shunt resistance element 100 connected between the electrodes of cell 26 by the electrical leads 52 and 54 and an EMF measuring circuit 102 connected in parallel across the resistance element 100.

The electrical shunting of the pumping cell 26, which is functioning as a galvanic cell in response to the difference in oxygen content of the reference oxygen environment and the fluid by resistance element 100, results in the drawing of current from the pumping cell 26. The current drawn from the cell results in the migration of oxygen as $O^=$ from the reference oxygen environment through the cell 26 to the fluid. The ionic oxygen $O^=$ recombines as diatomic oxygen and increases the oxygen content of the flowing fluid. The amount of oxygen introduced into the fluid or the doping of the fluid with oxygen is directly related to the current drawn through variable resistance element 100.

Figure 8:
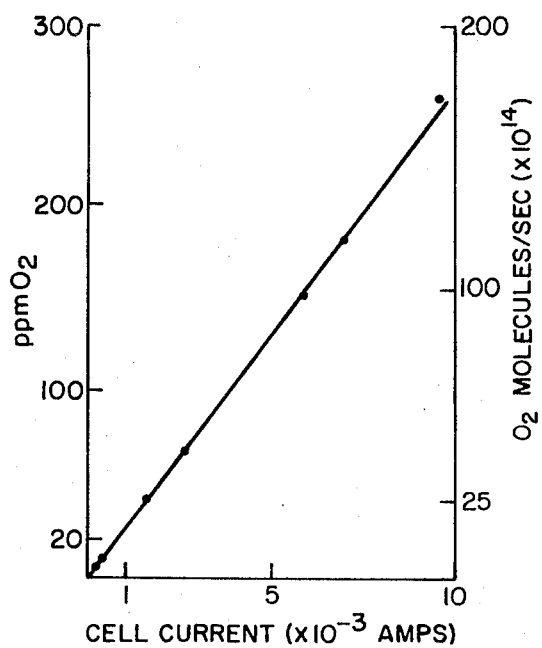
FIGS. 8, 9, and 10 are curves illustrating the operation of the embodiment of FIG. 4.

Assuming a known volume flow rate of the fluid as provided by the flow control device 82, the EMF measuring circuit can be calibrated to monitor the doping level of the fluid. This relationship, as illustrated in FIG. 8, provides for accurate doping of the fluid with oxygen by simply adjusting the current being drawn through the cell 26.

Figure 9:
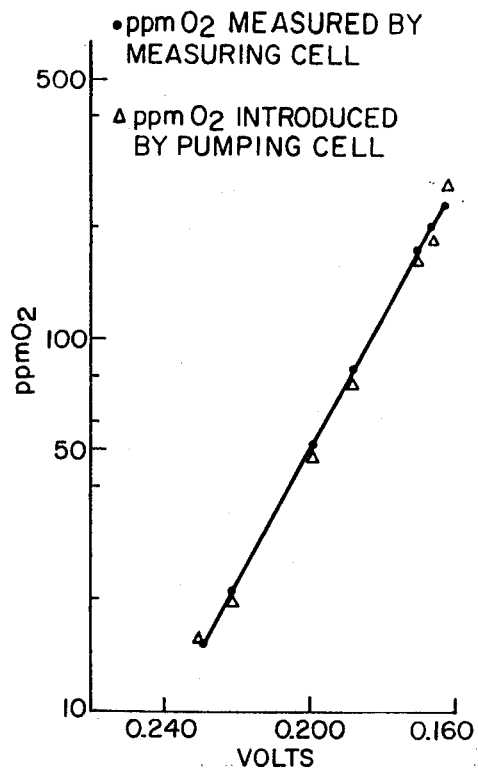
Figure 10:
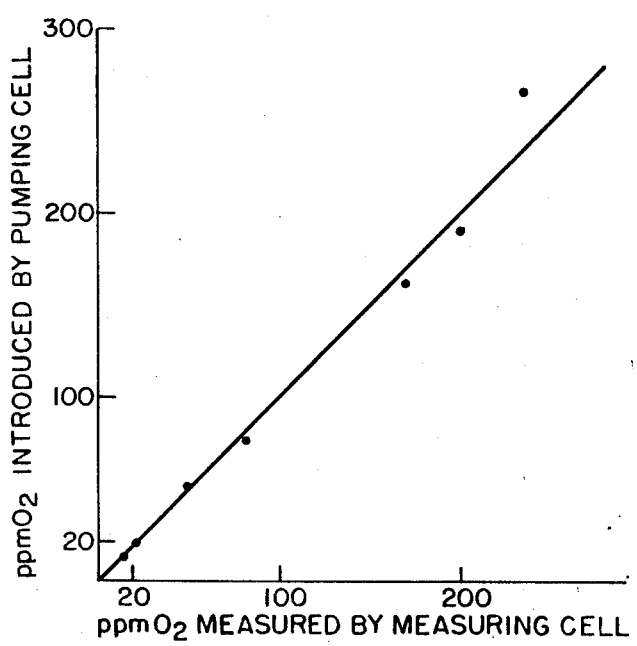

It has been demonstrated experimentally, as illustrated in FIG. 9, that a gas consisting of 10 p.p.m. $O_2$ with the balance nitrogen can be accurately doped with oxygen from 15 p.p.m. to approximately 250 p.p.m. The level of doping accomplished can be monitored by the measuring cell 36 as evidenced in FIG. 10.

The above operation of cell 26 also provides for the introduction of known amounts of oxygen into the fluid by establishing a predetermined current flow in the cell 26. This capability permits random in-line calibration of the measuring cell without the requirement of calibrated bottle gases and the associated inconvenient application thereof.

The measuring cell 36 as noted above functions as a galvanic cell by developing an EMF as an indication of the oxygen content of the fluid subsequent to doping by the pumping cell 26.

Figure 11:
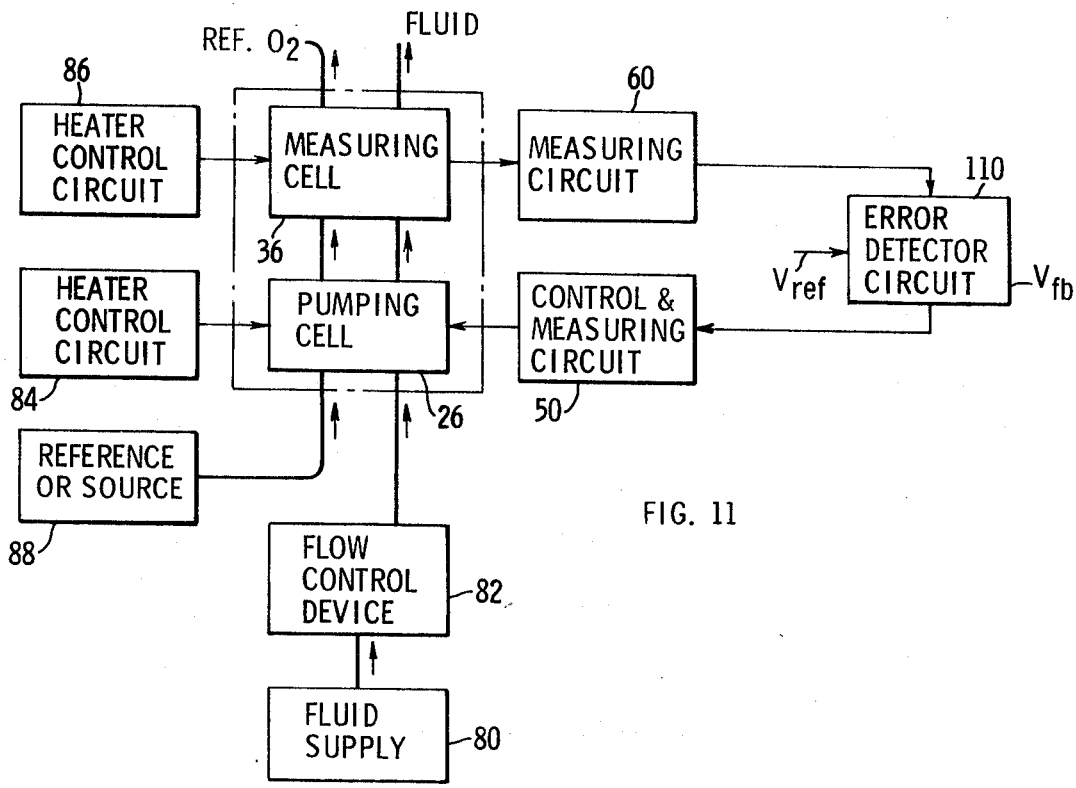
FIG. 11 is an alternate block diagram embodiment of the embodiments of FIGS. 3 and 4.

In FIG. 11 there is illustrated schematically the basic system circuits of FIGS. 3 and 4 with the addition of a feedback circuit, typically represented by the error detector circuit 110, which provides closed loop control of the pumping action of cell 26 as a function of the output signal of the measuring cell 36. As illustrated in FIG. 11 the incorporation of the cell detector circuit 110 as a feed back circuit provides stable control of the oxygen content of the fluid by comparing the measured oxygen content signal of circuit 60 with an established reference signal $V_{ref}$ and developing a feedback control signal $V_{fb}$ for adjusting the pumping action of cell 26.

Figure 12:
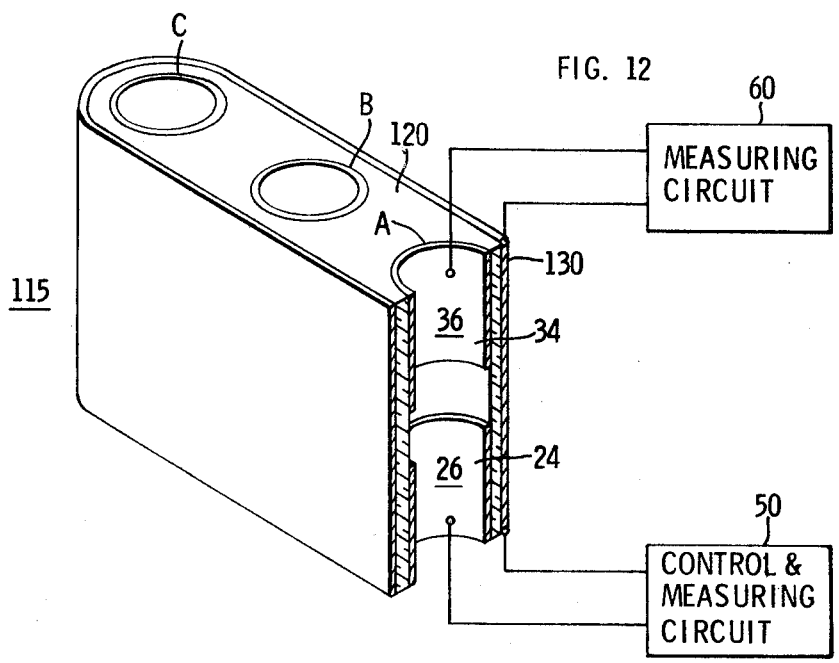
FIG. 12 is a sectioned schematic illustration of an alternate embodiment of the invention.

In FIG. 12 a plurality of dual cells A, B, C . . . of the type described in reference to the dual cell device 10 of FIG. 1 are combined to form a multi-channel system 115 in which the oxygen content of fluid in a plurality of fluid conduits (not shown) can be controlled and measured.

The multi-channel system 115 comprises a solid electrolyte member 120 and a common external electrode 130. The dual cells A, B, C . . . of the multi-channel system 115 consist essentially of parallel tubular passages extendingg parallel to the external electrode 130. Each dual cell, as illustrated with reference to duel cell A, comprises separate internal electrodes 24 and 34 which in cooperation with the external electrode 130 form pumping cell 26 and measuring cells 36 respectively. The control and measuring circuit 50 is connected across the electrodes of cell 26 and functions as described above. Similarly the measuring circuit 60 is connected across the electrodes of cell 36 to function in a manner as described above.

The multi-channel system 115 which utilizes a single electrolyte member and a common external electrode permits compact fabrication of a system in which the oxygen content of many fluid streams may be controlled independently or interdependently as required.

A heater circuit (not shown) similar to that of FIGS. 1, 3 and 4 can be employed to control the temperature of each cell, each dual cell combination, or the entire multi-channel system.

Various modifications may be made within the scope of this invention.

We claim:

1. In a multi-channel system for monitoring the oxygen content of fluid flowing in a plurality of conduits, the combination comprising a solid electrolyte member composed of a composition exhibiting negligible electronic conductivity and substantial oxygen ion conductivity and having a plurality of substantially parallel passages extending therethrough between first and second opposite ends of said solid electrolyte member, and in operative relationship with said conduits, a first electrode disposed on the surfaces of each of said passages, a single, continuous second electrode disposed on the external surface of said solid electrolyte member opposite to said first electrodes, the combination of each of said first electrodes with said second electrode forming a plurality of independent solid electrolyte electrochemical oxygen measuring cells, means for maintaining an oxygen environment of known oxygen content in contact with said secod electrode, each of said plurality of independent solid electrolyte electrochemical oxygen measuring cells adapted to generate an EMF indicative of the oxygen content of the fluid flowing in the respective passages.

2. In a multi-channel system as claimed in claim 1, including a third electrode disposed in contact with the surface of each of said passages and in opposed relationship with said second electrode, each of said third electrodes cooperating with said second electrode to form a plurality of second solid electrolyte electrochemical cells, electrical circuit means operatively connected across said second and third electrodes to impose a potential across said second and third electrodes to establish said second solid electrolyte electrochemical cells as oxygen pumps.

3. A multi-channel system as claimed in claim 2 further including a second electrical circuit means operatively connected between said oxygen measuring cells and said second solid electrolyte electrochemical cells to control the pumping of said second solid electrolyte electrochemical cells as a function of the EMF generated by said oxygen measuring cells.

References Cited

UNITED STATES PATENTS

| | | | |
|---|---|---|---|
| 3,514,377 | 5/1970 | Spacil et al. | 204—1 |
| 3,120,456 | 2/1964 | Broers | 136—86 |
| 3,188,283 | 6/1965 | Cole | 204—195 X |
| 3,525,646 | 8/1970 | Tannenberger et al. | 136—86 |

GERALD L. KAPLAN, Primary Examiner

U.S. Cl. X.R.

204—1 T